US009482180B2

(12) United States Patent
Bol

(10) Patent No.: US 9,482,180 B2
(45) Date of Patent: Nov. 1, 2016

(54) THRUST REVERSER SYSTEM

(75) Inventor: Eric D. Bol, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 1408 days.

(21) Appl. No.: 13/480,299

(22) Filed: May 24, 2012

(65) Prior Publication Data

US 2013/0313337 A1 Nov. 28, 2013

(51) Int. Cl.
F02K 1/72 (2006.01)
F02K 1/76 (2006.01)
F01D 17/24 (2006.01)

(52) U.S. Cl.
CPC .............. F02K 1/72 (2013.01); F01D 17/24 (2013.01); F02K 1/763 (2013.01); F05D 2220/77 (2013.01); F05D 2250/41 (2013.01); F05D 2270/62 (2013.01); Y02T 50/671 (2013.01)

(58) Field of Classification Search
CPC ............ F02K 1/76; F02K 1/72; F02K 1/763
USPC .................................. 318/135, 687
See application file for complete search history.

(56) References Cited

U.S. PATENT DOCUMENTS

| 3,829,020 | A | | 8/1974 | Stearns | |
|---|---|---|---|---|---|
| 4,852,805 | A | | 8/1989 | Vermilye | |
| 5,091,665 | A | * | 2/1992 | Kelly | G01P 3/52 310/12.19 |
| 5,960,626 | A | * | 10/1999 | Baudu et al. | 60/226.2 |
| 6,564,541 | B2 | * | 5/2003 | Ahrendt | 60/204 |
| 6,655,125 | B2 | * | 12/2003 | Johnson et al. | 60/226.2 |
| 6,771,032 | B2 | * | 8/2004 | Cox-Smith et al. | 318/85 |
| 7,370,468 | B2 | * | 5/2008 | Colotte et al. | 60/226.2 |
| 7,378,765 | B2 | * | 5/2008 | Iwasa | H02K 33/00 301/14 |
| 7,834,494 | B2 | * | 11/2010 | Blanding | B64C 13/00 310/112 |

| 2004/0007923 | A1 | | 1/2004 | Tesar | |
|---|---|---|---|---|---|
| 2004/0231317 | A1 | | 11/2004 | Dehu et al. | |
| 2008/0229851 | A1 | | 9/2008 | Jones et al. | |
| 2010/0218479 | A1 | | 9/2010 | Moradell-Casellas et al. | |
| 2011/0016846 | A1 | * | 1/2011 | Maalioune | 60/226.2 |
| 2011/0088369 | A1 | * | 4/2011 | Maalioune et al. | 60/204 |
| 2012/0036830 | A1 | * | 2/2012 | Maalioune | 60/226.2 |
| 2012/0098469 | A1 | * | 4/2012 | Takeuchi | H02P 6/182 318/135 |
| 2013/0312387 | A1 | * | 11/2013 | West | F02K 1/09 60/226.2 |

FOREIGN PATENT DOCUMENTS

EP 1793477 A1 6/2007
EP 1978231 A2 10/2008
EP 2181262 B1 5/2012

OTHER PUBLICATIONS

"Goodrich Ships First Thrust Reverser for Airbus A350 XWB Engine Ground Testing," Goodrich Corporation, Nov. 2010, 2 pages, accessed Apr. 20, 2012, http://www.goodrich.com/Goodrich/Enterprise/News/InFocus-Archive/Goodrich-Ships-First-Thrust-Reverser-for-Airbus-A350-XWB-Engine-Ground-Testing.
Extended European Search Report, dated Jun. 15, 2015, regarding Application No. EP13165423.8, 6 pages.
Canadian Intellectual Property Office Examination Search Report, dated Aug. 6, 2015, regarding Application No. 2,807,905, 4 pages.
English Translation of State Intellectual Property Office of China First Notification of Office Action, issued Nov. 17, 2015, regarding Application No. 2013101937125, 12 pages.

* cited by examiner

Primary Examiner — Phutthiwat Wongwian
Assistant Examiner — Stefan Ibroni
(74) Attorney, Agent, or Firm — Yee & Associates, P.C.

(57) ABSTRACT

A method and apparatus comprising a sleeve, at least one linear electric motor connected to the sleeve, and a controller. The sleeve is configured to move between a first position and a second position. The sleeve exposes a cascade when in the second position. The at least one linear electric motor is configured to move the sleeve between the first position and the second position. The controller is configured to control operation of the at least one linear electric motor to move the sleeve between the first position and the second position.

21 Claims, 15 Drawing Sheets

THRUST REVERSER SYSTEM

BACKGROUND INFORMATION

1. Field

The present disclosure relates generally to aircraft and, in particular, to controlling movement aircraft. Still more particularly, the present disclosure relates to a method and apparatus for reversing thrust in an aircraft using a thrust reverser system.

2. Background

When a typical commercial or military sized aircraft lands, the passenger aircraft may land at a speed from about 140 mph to about 160 mph. These aircraft may weigh from about 80,000 pounds to over 800,000 pounds. Reducing the velocity of an aircraft of these weights and at these speeds may be challenging. Therefore, these aircraft typically require robust systems that can handle the force of slowing down and stopping the passenger aircraft.

When an aircraft lands, reducing the speed of the aircraft to bring the aircraft to a stopped position may involve many different mechanisms. In stopping the movement of an aircraft after landing, one type of system used to reduce the speed of the aircraft is a landing gear system. These landing gear systems use breaks to slow down the aircraft. The aircraft brakes are designed to absorb large amounts of energy to reduce the speed of the aircraft.

Control surface systems may be used to reduce the speed of the aircraft after landing. For example, ground spoilers may be deployed after the aircraft lands to slow down the speed of the aircraft.

Another system used to reduce the speed of an aircraft involves changing the direction of thrust in the jet engines in the aircraft. Thrust reverser systems are employed on engines to change the direction of thrust. In particular, the direction of thrust is changed from a direction aft of the aircraft to a direction toward the front or forward part of the aircraft.

Thrust reverser systems may include sections such as sleeves that open at the rear of an engine. With a thrust reverser system, a sleeve covering cascades may be moved in an aftward direction. The cascades are an array of structures that direct airflow in an engine. These cascades, when exposed, may direct airflow out through the side of the engine and in a forward direction rather than the airflow flowing in an aft direction out of the engine.

Additionally, when the sleeve is moved, blockers or other structures also may block the opening through which the exhaust typically flows out of the engine. These blocking structures along with the cascades may direct air in the forward direction to reduce the speed of the aircraft.

These sleeves and other components are typically moved using hydraulic systems, motors, actuators, valves and plumbing components that add undesired weight and complexity to the aircraft. With the number of components used to move the sleeves, maintenance may be more time consuming and expensive than desired. Also, the aircraft and the engine may weigh more and may be more expensive to manufacture than desired.

Therefore, it would be desirable to have a method and apparatus that improves at least one of the issues discussed above as well as possibly other issues.

SUMMARY

In one illustrative embodiment, an apparatus comprises a sleeve, at least one linear electric motor connected to the sleeve, and a controller. The sleeve is configured to move between a first position and a second position. The sleeve exposes a cascade when in the second position. The at least one linear electric motor is configured to move the sleeve between the first position and the second position. The controller is configured to control operation of the at least one linear electric motor to move the sleeve between the first position and the second position.

In another illustrative embodiment, a thrust reverser system comprises a sleeve and at least one linear electric motor. The sleeve is configured to move between a first position and a second position. The sleeve exposes a cascade when in the second position. The at least one linear electric motor has a base end connected to an engine structure and a member directly connected to the sleeve. The at least one linear electric motor is configured to move the sleeve between the first position and the second position.

In yet another illustrative embodiment, a method for operating a thrust reverser system for an aircraft is present. A sleeve on an engine in the thrust reverser system is moved from a first position to a second position using a linear electric motor connected to the sleeve and to the structure of the engine. The sleeve is moved to a second position and exposes a cascade such that exhaust gasses generated by the engine pass through the cascade.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that hydraulic systems used to control a sleeve for a thrust reverser system include a reservoir, a hydraulic fluid pump, directional control valves, isolation valves, tubes, seals, mechanical sink shafts, sink locks, position sensors, and other components. These different components add to the complexity of a hydraulic system used to move the sleeve in a thrust reverser system.

The illustrative embodiments recognize and take into account that the use of interfaces such as mechanical linkages may add to the complexity of a mechanism used to move sleeves in a thrust reverser system. The illustrative embodiments also recognize and take into account that a hydraulic system also may not provide as much precision as desired in moving a thrust reverser. The illustrative embodiments also recognize and take into account that in addition to the complexity, hydraulic systems may have increased maintenance needs and leaks that may result in undesired fluids entering different components of the engine that also may require maintenance.

Further, the illustrative embodiments also recognize and take into account that electro-mechanical systems may be used in place of hydraulic systems. These electro-mechanical systems, however, still include gears and other components as an interface between the motor and the sleeve. The illustrative embodiments also recognize and take into account that with currently used electro-mechanical motors, the gears and other components may require maintenance more often than desired.

Thus, the illustrative embodiments provide a method and apparatus for moving a sleeve in a thrust reverser system. In one or more illustrative embodiments, mechanical interfaces between the motor and the sleeve are not used. Instead, an electric motor may be directly connected to the sleeve. In these illustrative examples, the electric motor used to move the sleeve is a linear electric motor and, in particular, a digital linear electric motor.

Figure 1:
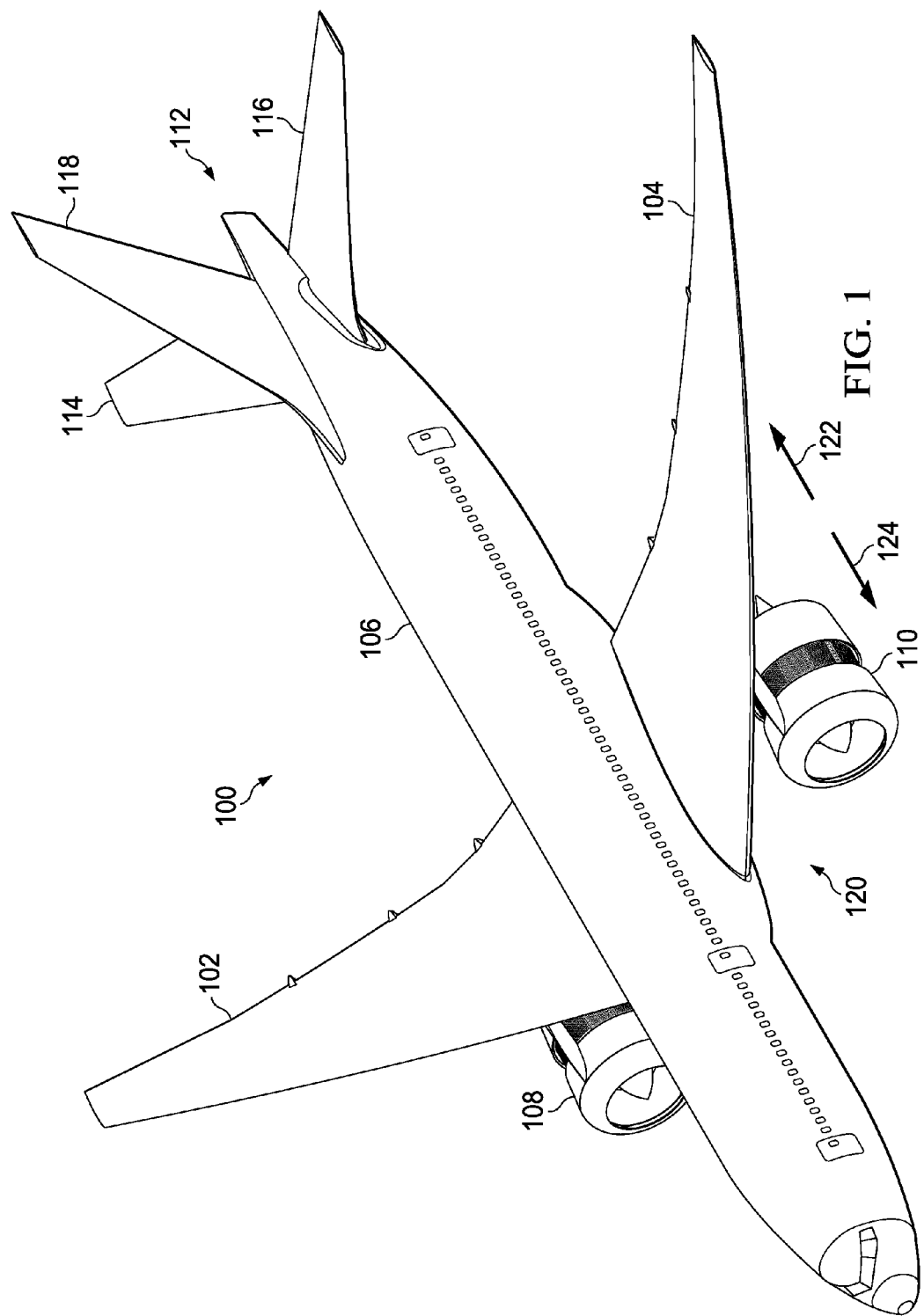
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thrust reverser system 120 may be implemented in accordance with an illustrative embodiment. In particular, a thrust reverser system 120 may be implemented in engine 108 and engine 110. Thrust reverser system 120 may redirect the flow of engine exhaust gases and effectively change the thrust generated by engine 108 and engine 110 from an aft direction as indicated by arrow 122 to a forward direction as indicated by arrow 124.

In these illustrative embodiments, thrust reverser system 120 may be implemented in a manner that reduces maintenance as compared to hydraulic systems used in currently available thrust reverser systems. Further, the illustrative examples may be implemented in a manner that reduces the use of complex mechanical linkages, complex mechanical transmissions, or both.

Figure 2:
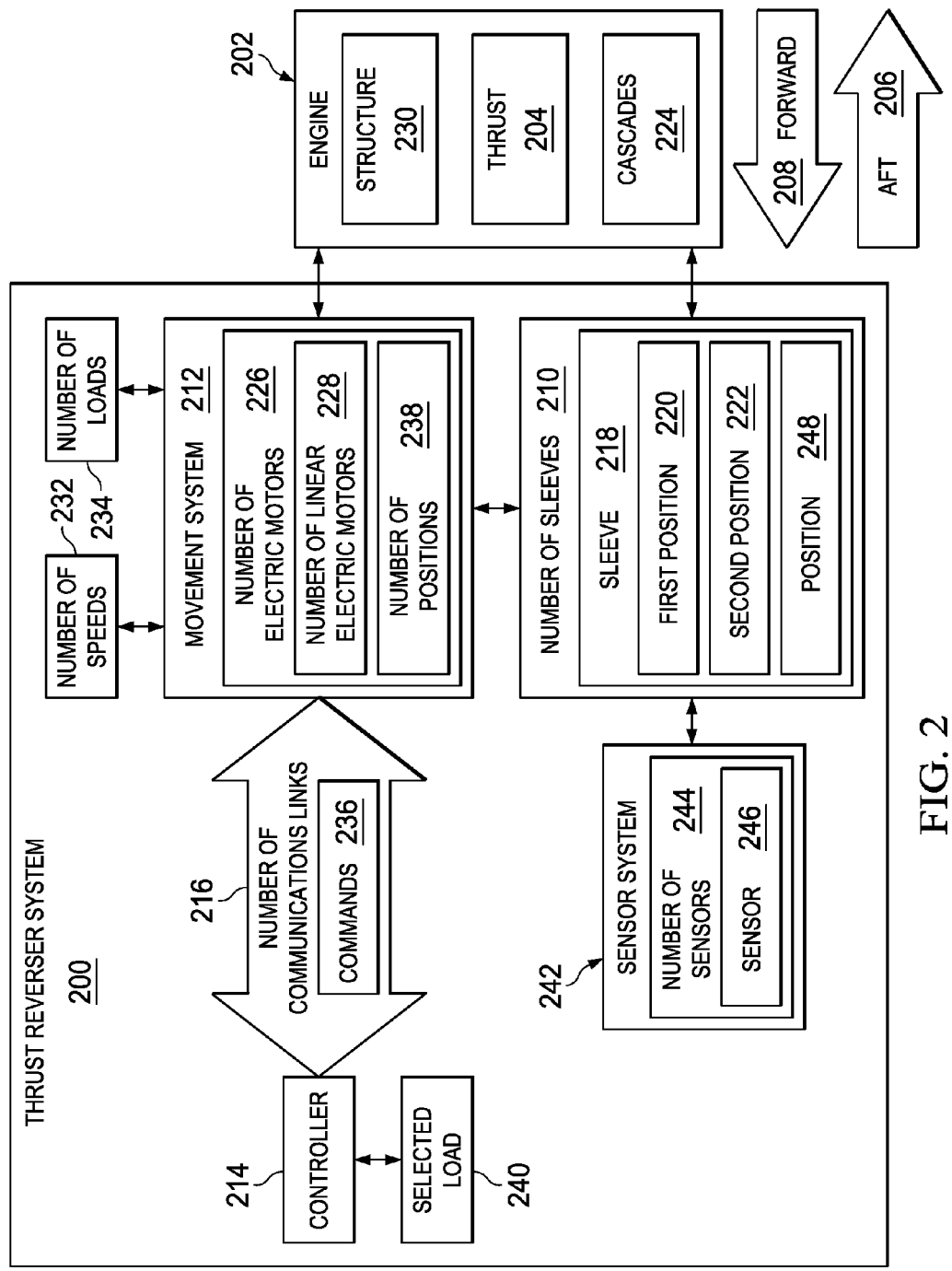
FIG. 2 is an illustration of a block diagram of a thrust reverser system in accordance with an illustrative embodiment.

With reference now to FIG. 2, an illustration of a block diagram of a thrust reverser system is depicted in accordance with an illustrative embodiment. In this illustrative example, thrust reverser system 200 is an example of a thrust reverser system that may be used to implement thrust reverser system 120 in aircraft 100 in FIG. 1.

As depicted, thrust reverser system 200 may be associated with engine 202. When one component is "associated" with another component, the association is a physical association in these depicted examples. For example, a first component, thrust reverser system 200, may be considered to be associated with a second component, engine 202, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Thrust reverser system 200 may operate to change the direction of thrust 204 from substantially aft 206 to substantially forward 208. Thrust 204 is generated by airflow through engine 202 in these illustrative examples. Airflow may include other gases as well as air that enter engine 202.

In these illustrative examples, thrust reverser system 200 includes number of sleeves 210, movement system 212, and controller 214. Number of sleeves 210 is associated with engine 202 and may move to change the direction of thrust 204.

Movement system 212 is configured to move number of sleeves 210 on engine 202. In these illustrative examples, the operation of movement system 212 is controlled by controller 214. Controller 214 may be implemented using hardware, software, or a combination of the two. When software is used, the operations performed by the components may be implemented in the program code configured to be run on a processor unit. When hardware is employed, the hardware may include circuits that operate to perform the operations in the components.

In these illustrative examples, the hardware for controller 214 may take the form of a computer system, a processor unit, a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 214 is in communication with movement system 212 using number of communications links 216. As used herein, a "number of" when used with reference to items means one or more items. For example, number of communications links 216 is one or more communications links.

In these illustrative examples, number of communications links 216 may be comprised of at least one of a wire, an optical fiber, a wireless link, and other suitable types of communications links. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, sleeve 218 is a sleeve within number of sleeves 210. Sleeve 218 is moveable between first position 220 and second position 222. Movement of sleeve 218 is controlled by movement system 212. Further, movement system 212 also may maintain the position of sleeve 218 when sleeve 218 is not moving. This position may be first position 220, second position 222, or some position between the two.

When sleeve 218 is in first position 220, sleeve 218 covers cascades 224. Cascades 224 are structures that direct airflow. Cascades 224 may take various forms. For example, cascades 224 may be airfoils, channels through a structure, or other suitable types of structures.

When sleeve 218 is in second position 222, cascades 224 are exposed. In particular, cascades 224 are configured to direct airflow in a direction that is substantially forward 208 when sleeve 218 is in second position 222. Further, when sleeve 218 is in a position between first position 220 and second position 222, cascades 224 may be partially exposed such that cascades 224 direct thrust 204 in a direction that is substantially forward 208. In this position, thrust 204 also may still be directed in a direction that is substantially aft 206.

In these illustrative examples, movement system 212 includes number of electric motors 226. In particular, number of electric motors 226 may take the form of number of linear electric motors 228. An electric motor is a hardware device that converts electrical energy into mechanical energy. A linear electric motor is an electric motor that generates movement that is linear as opposed to rotational movement. In other words, a linear electric motor may cause movement along a straight line.

Number of electric motors 226 may be connected to structure 230 in engine 202 and to sleeve 218. As depicted, the connection is a direct connection. In these illustrative examples, a direct connection is a connection that does not use linkages, gear systems, or other moving parts. The direct connection may include other components between number of electric motors 226 and sleeve 218, structure 230, or both that are non-moving parts in these illustrative examples. In particular, these are non-moving parts that are used to aid in moving sleeve 218 between first position 220 and second position 222.

In these illustrative examples, controller 214 is configured to control operation of number of electric motors 226 when moving sleeve 218. Number of electric motors 226 may move sleeve 218 at number of speeds 232 and with number of loads 234. In other words, depending on the alignment or positioning of number of electric motors 226, different electric motors in number of electric motors 226 may operate at different speeds when moving sleeve 218.

Further, the connection of number of electric motors 226 to sleeve 218 and other sources of load may result in number of electric motors 226 having number of loads 234 applied during movement of sleeve 218. Different loads in number of loads 234 may be different for different electric motors in number of electric motors 226 when moving sleeve 218. Number of loads 234 may be on number of electric motors 226 may be detected by sensor system 242.

In these illustrative examples, controller 214 is configured to send commands 236 over number of communications links 216 to number of electric motors 226 to cause number of electric motors 226 to move to number of positions 238. The movement of electric motors 226 to number of positions 238 is configured to cause movement of sleeve 218 between first position 220 and second position 222 or to other positions in between the two.

Number of electric motors 226 may send back information such as number of loads 234 and number of positions 238 to controller 214. In this example, portions of sensor system 242 may be located in or part of number of electric motors 226. This information may be used by controller 214 to control the operation of number of electric motors 226. Controller 214 may use this information to synchronize number of electric motors 226 to move sleeve 218. In other words, operation of number of electric motors 226 may be controlled such that sleeve 218 moves between first position 220 and second position 222 in a desired manner. This synchronization may reduce loads on sleeve 218, number of electric motors 226, or both.

Further, with number of loads 234, controller 214 may control number of speeds 232 such that number of loads 234 does not exceed selected load 240. In this manner, different types of number of electric motors 226 may be used. For example, number of electric motors 226 may be selected to operate with number of loads 234 that is less than selected load 240. In particular, controller 214 may send commands 236 to control operation of number of electric motors 226 such that number of loads 234 on number of electric motors 226 is less than selected load 240.

For example, when moving sleeve 218 between first position 220 and second position 222, number of loads 234 on number of electric motors 226 may be substantially the same for most of the movement of sleeve 218. A spike in these loads may increase above the loads designed for number of electric motors 226. In other words, the increase in the load may only be for a short distance or time.

As a result, controller 214 may control number of speeds 232 such that number of loads 234 remains below selected load 240 such that the spike does not increase wear on number of electric motors 226. In other words, slowing number of speeds 232 may maintain number of loads 234 at a level below selected load 240. Thus, smaller electric motors may be selected for number of electric motors 226 than would be needed if number of electric motors 226 is selected to take into account spikes in number of loads 234.

Further, thrust reverser system 200 also may include sensor system 242. Sensor system 242 is associated with number of sleeves 210. In these illustrative examples, sensor system 242 may comprise number of sensors 244 in which each sensor in number of sensors 244 is configured to monitor a sleeve in number of sleeves 210.

Sensor 246 in number of sensors 244 in sensor system 242 may, for example, detect position 248 of sleeve 218. Position 248 identified by sensor system 242 may supplement number of positions 238 sent from number of electric motors 226 to controller 214. In some cases, position 248 may be used in place of number of positions 238.

Thus, with thrust reverser system 200, less maintenance may be needed with the use of number of electric motors 226. Further, the connection of number of electric motors 226 without the use of components such as linkages, gears, and other moving components that translate movement from number of electric motors 226 to movement of sleeve 218 may reduce the complexity of thrust reverser system 200. Further, with the use of number of electric motors 226, issues associated with fluids and other components in hydraulics systems may be reduced or avoided.

Also, the use of number of electric motors 226 may provide for more precision in moving sleeve 218. Also, the size and weight of number of electric motors 226 may be reduced through the use of selected load 240 as a threshold to manage number of loads 234 encountered by number of electric motors 226 when moving sleeve 218.

The illustration of thrust reverser system 200 in FIG. 2 is not meant to imply physical or architectural limitations to the manner in which a thrust reverser system may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative embodiments, thrust reverser system 200 may include other components in addition to the ones depicted in FIG. 2. For example, block structures may be present in thrust reverser system 200 that are configured to reduce or block airflow toward a direction that is aft 206. These structures may increase airflow through cascades 224 to increase thrust in a direction that is substantially forward 208.

Figure 3:
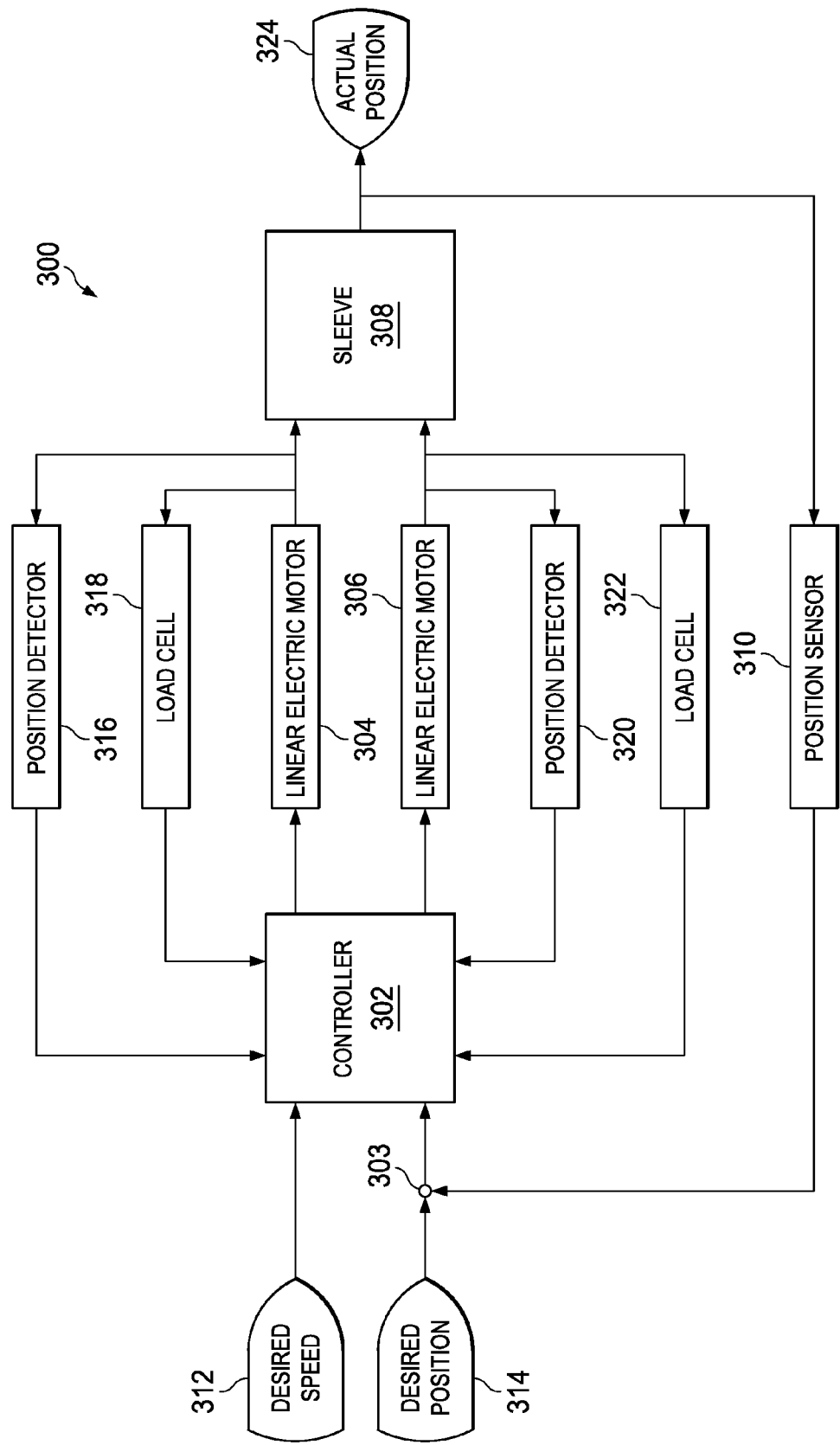
FIG. 3 is an illustration of a control diagram for a thrust reverser system in accordance with an illustrative embodiment.

Turning next to FIG. 3, an illustration of a control diagram for a thrust reverser system is depicted in accordance with an illustrative embodiment. In this illustrative example, a control diagram for thrust reverser system 300 is depicted. Thrust reverser system 300 is one example of an implementation for thrust reverser system 200 shown in a conceptual block form in FIG. 2.

Thrust reverser system 300 includes controller 302, summing node 303, linear electric motor 304, linear electric motor 306, sleeve 308, and position sensor 310. Controller 302 is configured to receive inputs, such as desired speed 312 and desired position 314. Desired speed 312 is a speed that is desired for the movement of sleeve 308 to desired position 314. Desired position 314 may be a position such as first position 220 and second position 222 in FIG. 2, or any position in between the two.

In response to receiving these inputs, controller 302 sends commands to linear electric motor 304 and linear electric motor 306. Controller 302 is an example of controller 214 in FIG. 2. Linear electric motor 304 and linear electric motor 306 are examples of linear electric motors in number of linear electric motors 228 in FIG. 2. These commands are commands identifying acceleration for these linear electric motors. These commands may be varied during movement of sleeve 308 to maintain a desired load on the linear electric motors. Sleeve 308 is an example of sleeve 218 in number of sleeves 210 in FIG. 2.

As depicted, feedback may be received through position detector 316 and load cell 318 for linear electric motor 304. Feedback also may be received through position detector 320 and load cell 322 for linear electric motor 306. Position detector 316 and position detector 320 send information about the position of linear electric motor 304 and linear electric motor 306, respectively. Load cell 318 and load cell 322 send information about loads for linear electric motor 304 and linear electric motor 306, respectively. This information about position and load are received by controller 302.

In these illustrative examples, position detector 316 and load cell 318 may be part of linear electric motor 304 or may be separate sensors. In a similar fashion, position detector 320 and load cell 322 may be part of linear electric motor 306 or separate components depending on the particular implementation.

The load information is used to ensure that the load does not exceed a desired load for the linear electric motors. Further, the load information also is used to maintain a desired load on the linear electric motors. For example, the load may be maintained at a consistent level in these illustrative examples.

The position information is used to identify the current position of each linear electric motor. The position of the linear electric motor may correlate to actual position 324 of sleeve 308. In this manner, sleeve 308 may be moved to desired position 314. Further, moving sleeve 308 past desired position 314 also may be reduced or avoided through the information received from position detector 316 and position detector 320. As a result, sleeve 308 may not move to an undesired position that may cause an undesired load on other components in the engine.

Additionally, controller 302 also may be configured to maintain linear electric motor 304 and linear electric motor 306 in desired position 314 when actual position 324 reaches desired position 314. In other words, linear electric motor 304 and linear electric motor 306 may be locked to prevent inadvertent movement of sleeve 308 when sleeve 308 is in desired position 314.

These locking mechanisms may be implemented in a number of different ways. For example, linear electric motor 304 and linear electric motor 306 may be commanded to maintain a particular position. In other illustrative examples, a locking mechanism may physically lock linear electric motor 304 and linear electric motor 306 into a particular position. In yet other illustrative examples, movement by linear electric motor 304 and linear electric motor 306 may be prevented by a locking mechanism that engages sleeve 308 instead of linear electric motor 304 and linear electric motor 306. The locking mechanism (not shown) may be a physical locking mechanism external to linear electric motor 304 and linear electric motor 306 or may be one internal to linear electric motor 304 and linear electric motor 306 that is controlled by controller 214. In this manner, controller 214 may stop the sleeve 218 in at least one of the first position 220 and the second position 222.

In these illustrative examples, position sensor 310 is a sensor configured to identify actual position 324 of sleeve 308. Position sensor 310 is an example of sensor 246 in number of sensors 244 in sensor system 242 in FIG. 2. Actual position 324 is sent back to controller 302. Actual position 324 is compared to desired position 314 and may be used as another piece of information to determine whether sleeve 308 has reached desired position 314. Actual position 324 provided by position sensor 310 may be summed at summing node 303. In this manner, when the difference between desired position 314 and actual position 324 reaches zero, sleeve 308 is considered to be at desired position 314. In other illustrative examples, this comparison may be made within controller 302.

Further, with this type of feedback, undesired operation of one of linear electric motor 304 and linear electric motor 306 may be identified and taken into account. For example, if linear electric motor 306 does not move as desired, linear electric motor 306 may be commanded to "float". In other words, linear electric motor 306 may change position in response to movement of sleeve 308 without actively moving. In this example, linear electric motor 304 may be commanded to move to desired position 314 through commands sent by controller 302.

In this manner, thrust reverser system 300 may operate to move sleeve 308 to desired position 314 even though linear electric motor 306 does not operate as desired. This type of adaptability may reduce undesired operation, undesired wear, or other undesired effects that may occur by continuing to use linear electric motor 306.

The illustration of the control diagram for thrust reverser system 300 is not meant to limit the manner in which different thrust reverser systems may be implemented. For example, other thrust reverser systems may have other numbers of linear electric motors connected to sleeve 308. For example, three, four, or some other number of linear electric motors may be used. In still other illustrative examples, position sensor 310 may be omitted and actual position 324 of sleeve 308 may be identified through position information for linear electric motor 304 and linear electric motor 306.

Figure 4:
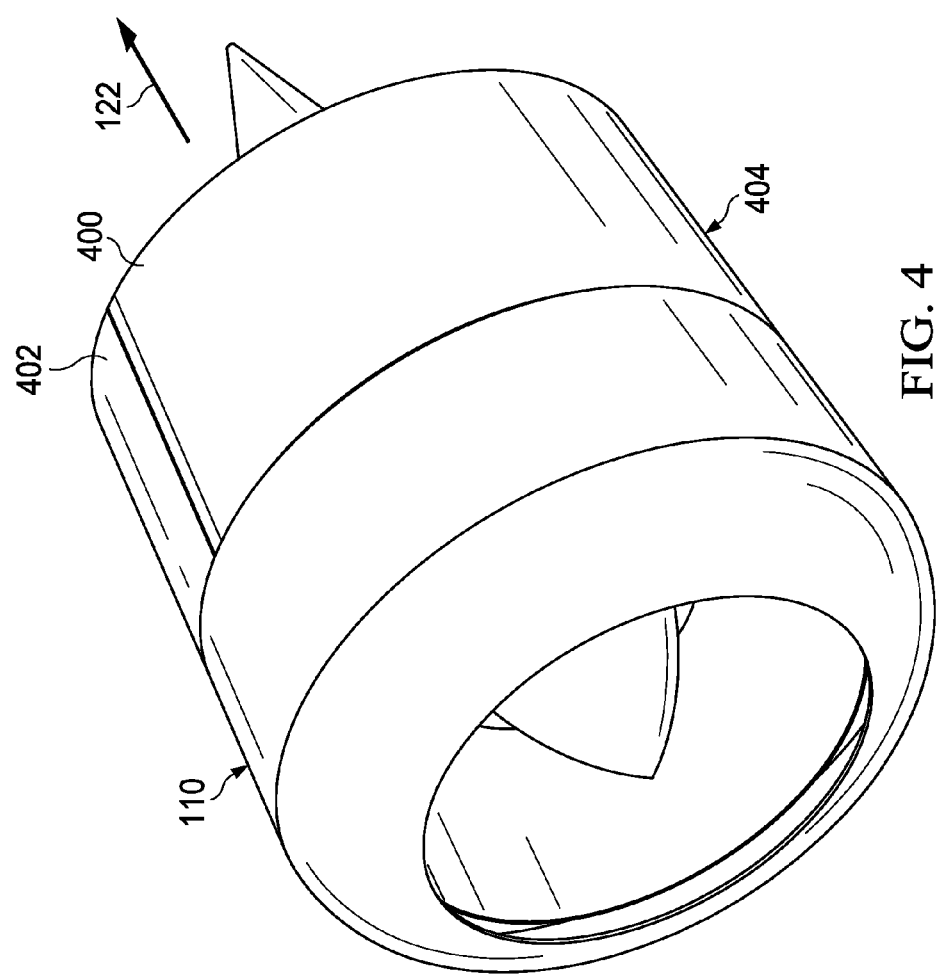
FIG. 4 is an illustration of an engine for an aircraft in accordance with an illustrative embodiment.

Turning now to FIG. 4, an illustration of an engine for an aircraft is depicted in accordance with an illustrative embodiment. In this depicted example, engine 110 for aircraft 100 is shown. As can be seen, engine 110 includes sleeve 400 and sleeve 402. In this illustrative example, sleeve 400 and sleeve 402 are shown in first position 404. As depicted, first position 404 is a substantially closed position. In first position 404, thrust is in the direction of arrow 122 which is an aft direction with respect to aircraft 100 in FIG. 1.

Figure 5:
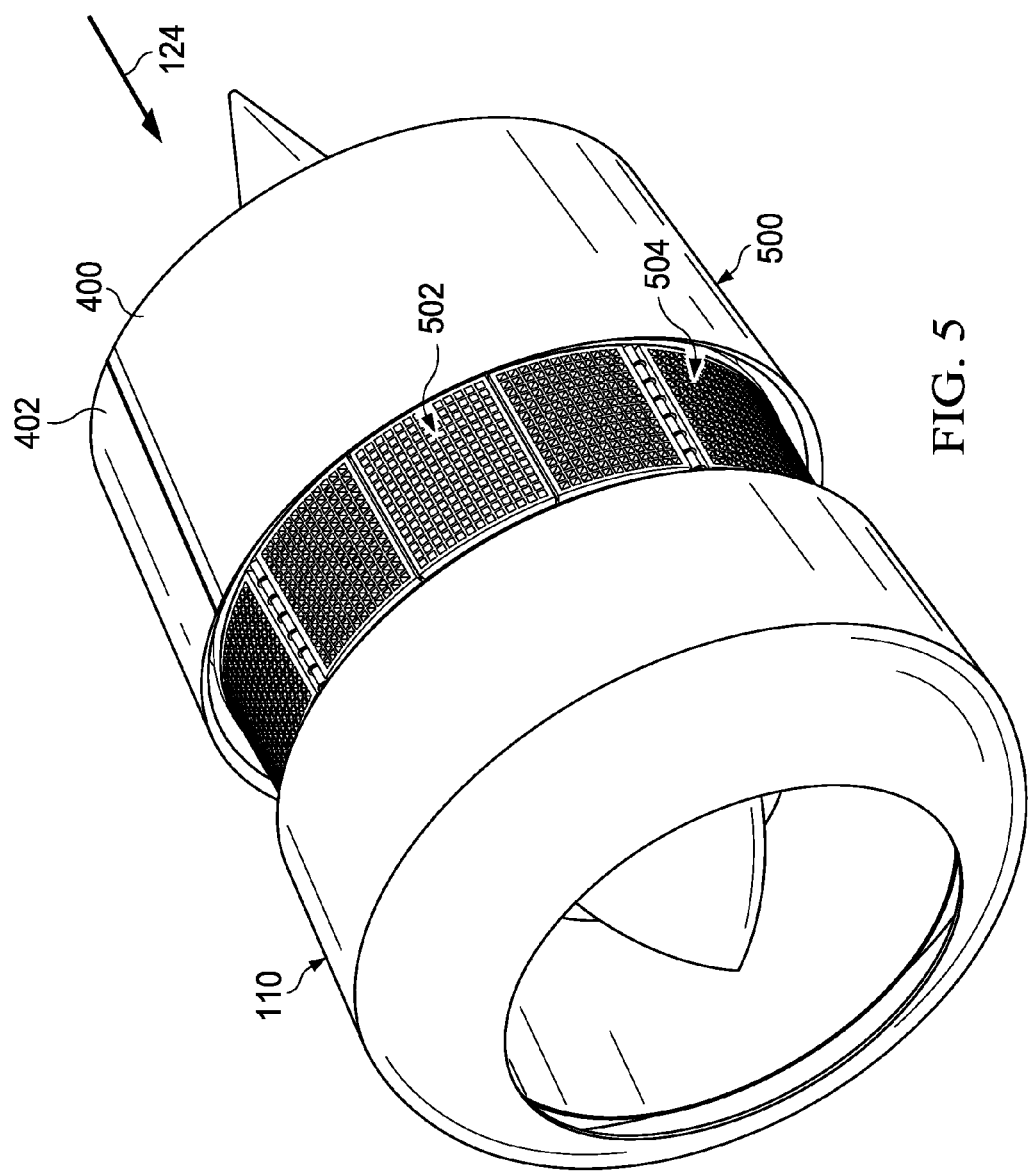
FIG. 5 is an illustration of an engine for an aircraft in accordance with an illustrative embodiment.

Turning now to FIG. 5, an illustration of an engine for an aircraft is depicted in accordance with an illustrative embodiment. In this example, sleeve 400 and sleeve 402 are shown in second position 500. Second position 500 is a substantially open position. In this position, cascades 502 are exposed. In this position, cascades 502 direct airflow in the direction of arrow 124 toward the front of aircraft 100 in FIG. 1.

In this illustrative example, movement system 504 is configured to move sleeve 400 and sleeve 402 into second position 500 from first position 404. Further, movement system 504 also may move these sleeves back to first position 404 from second position 500.

Figure 6:
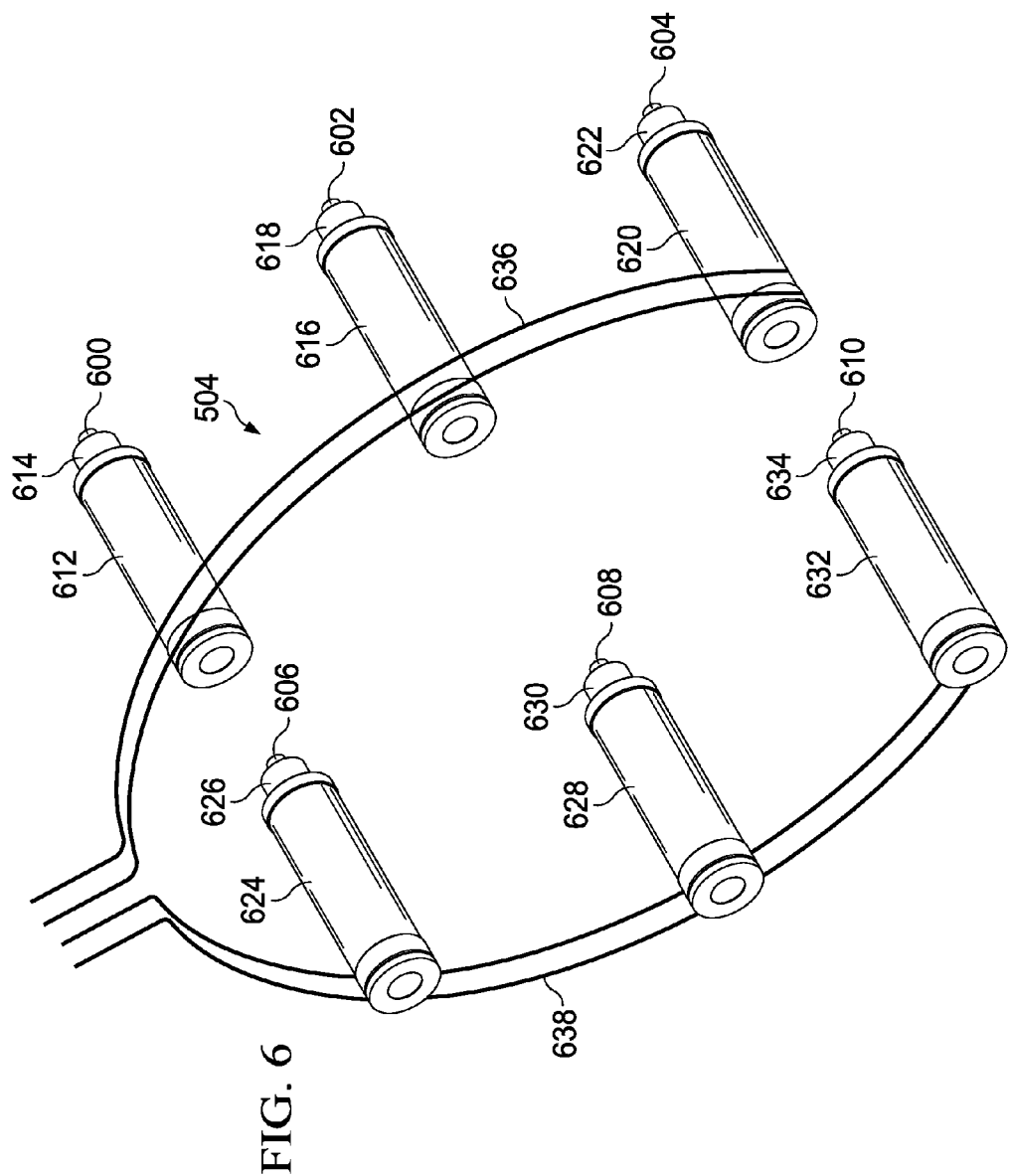
FIG. 6 is a detailed illustration of components in a movement system in accordance with an illustrative embodiment.

Turning now to FIG. 6, a more detailed illustration of components in a movement system is depicted in accordance with an illustrative embodiment. In this illustrative example, movement system 504 includes linear electric motor 600, linear electric motor 602, linear electric motor 604, linear electric motor 606, linear electric motor 608, and linear electric motor 610. Linear electric motors 600, 602, and 604 are connected to sleeve 400 (not shown). Linear electric motors 606, 608, and 610 are connected to sleeve 402.

These linear electric motors are also connected to a structure in engine 110. For example, the structure may be a cascade support ring, an engine housing, or other suitable structure.

More specifically, linear electric motor 600 has base 612 and member 614. Linear electric motor 602 has base 616 and member 618. Linear electric motor 604 has base 620 and member 622. Linear electric motor 606 has base 624 and member 626. Linear electric motor 608 has base 628 and member 630. Linear electric motor 610 has base 632 and member 634.

In these illustrative examples, the bases are connected to the structure in engine 110 while the members are connected to sleeve 400 and sleeve 402. The members are moveable members and may be moved to different positions to cause sleeve 400 and sleeve 402 to move between first position 404 in FIG. 4 and second position 500 in FIG. 5.

As depicted, base 612 of linear electric motor 600, base 616 of linear electric motor 602, and base 620 of linear electric motor 604 are connected to wiring harness 636. In a similar fashion, base 624 of linear electric motor 606, base 628 of linear electric motor 608, and base 632 of linear electric motor 610 are connected to wiring harness 638. These wiring harnesses may be connected to a controller to provide communications between the controller and these linear electric motors. A wiring harness may include one or more wires inside a protective cover.

Figure 7:
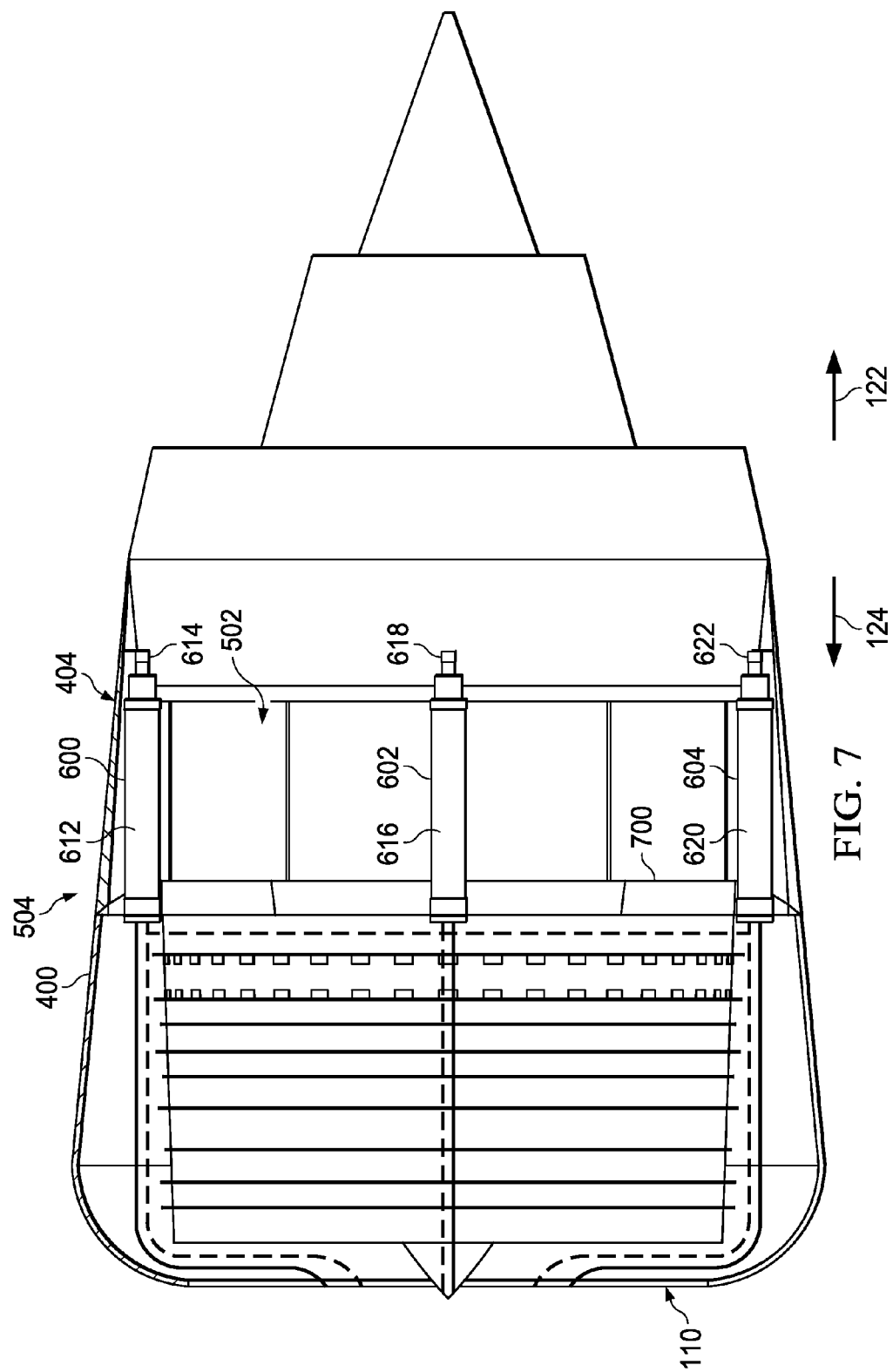
FIG. 7 is an illustration of an exposed view of an engine with a movement system configured to move a sleeve for a thrust reverser system in accordance with an illustrative embodiment.

Turning now to FIG. 7, an illustration of an exposed view of an engine with a movement system configured to move a sleeve for a thrust reverser system is depicted in accordance with an illustrative embodiment. In this illustrative example, movement system 504 is shown installed in engine 110.

In this exposed view, linear electric motor 600, linear electric motor 602, and linear electric motor 604 are depicted. As can be seen, base 612, base 616, and base 620 are connected to cascade ring 700. Member 614, member 618, and member 622 are connected to sleeve 400. These connections are not visible in this exposed view. As can be seen in this view, sleeve 400 is in first position 404 such that cascades 502 are not exposed.

First position 404 is a closed position in this example. In this position, thrust is substantially in the direction of arrow 122 as opposed to arrow 124.

Figure 8:
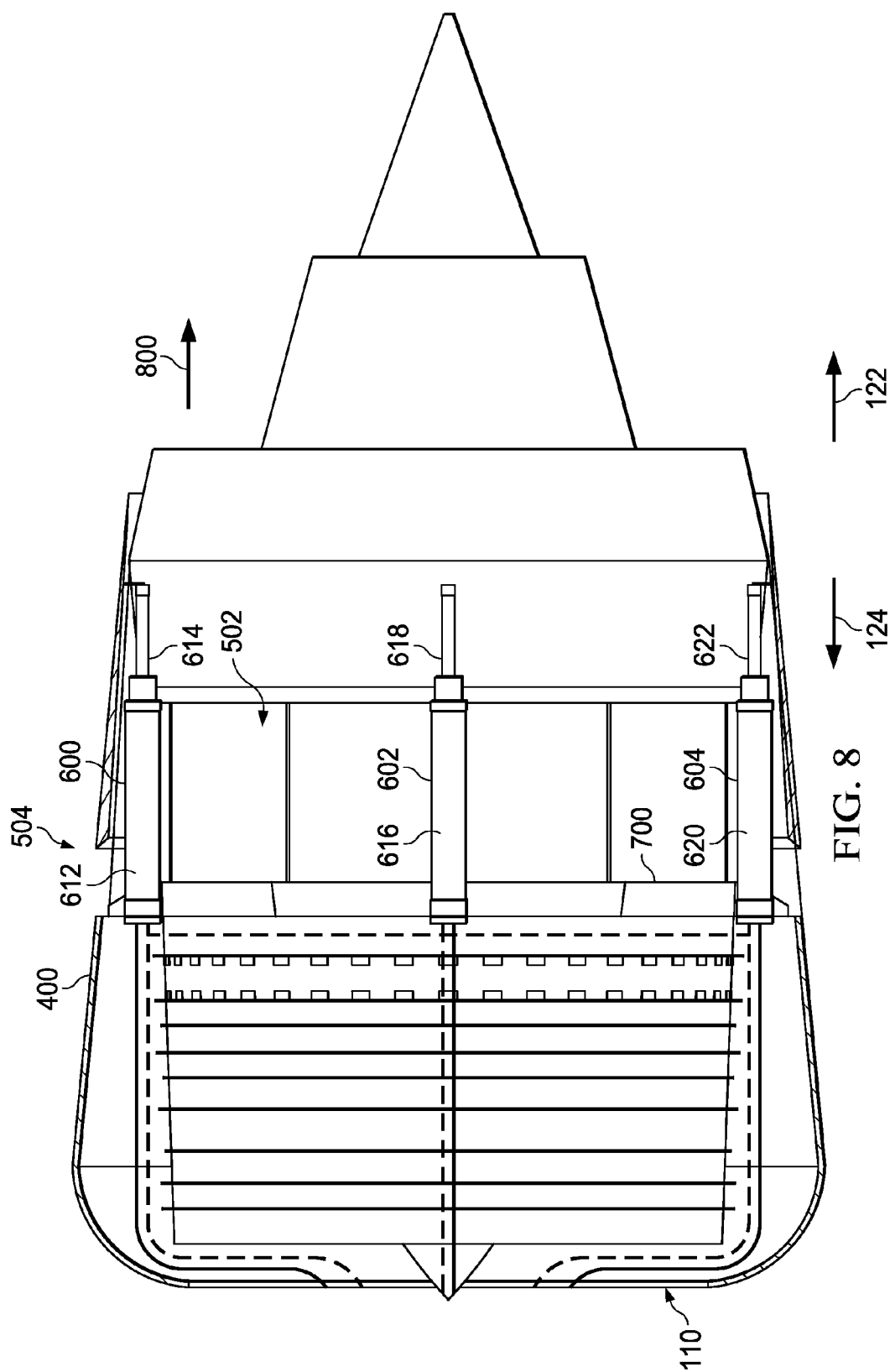
FIG. 8 is an illustration of an exposed view of an engine with a movement system configured to move a sleeve for a thrust reverser system in accordance with an illustrative embodiment.

Turning now to FIG. 8, an illustration of an exposed view of an engine with a movement system configured to move a sleeve for a thrust reverser system is depicted in accordance with an illustrative embodiment. In this figure, member 614, member 618, and member 622 have extended from base 612, base 616, and base 620 in the direction of arrow 800. In this example, cascades 502 are partially exposed.

Figure 9:
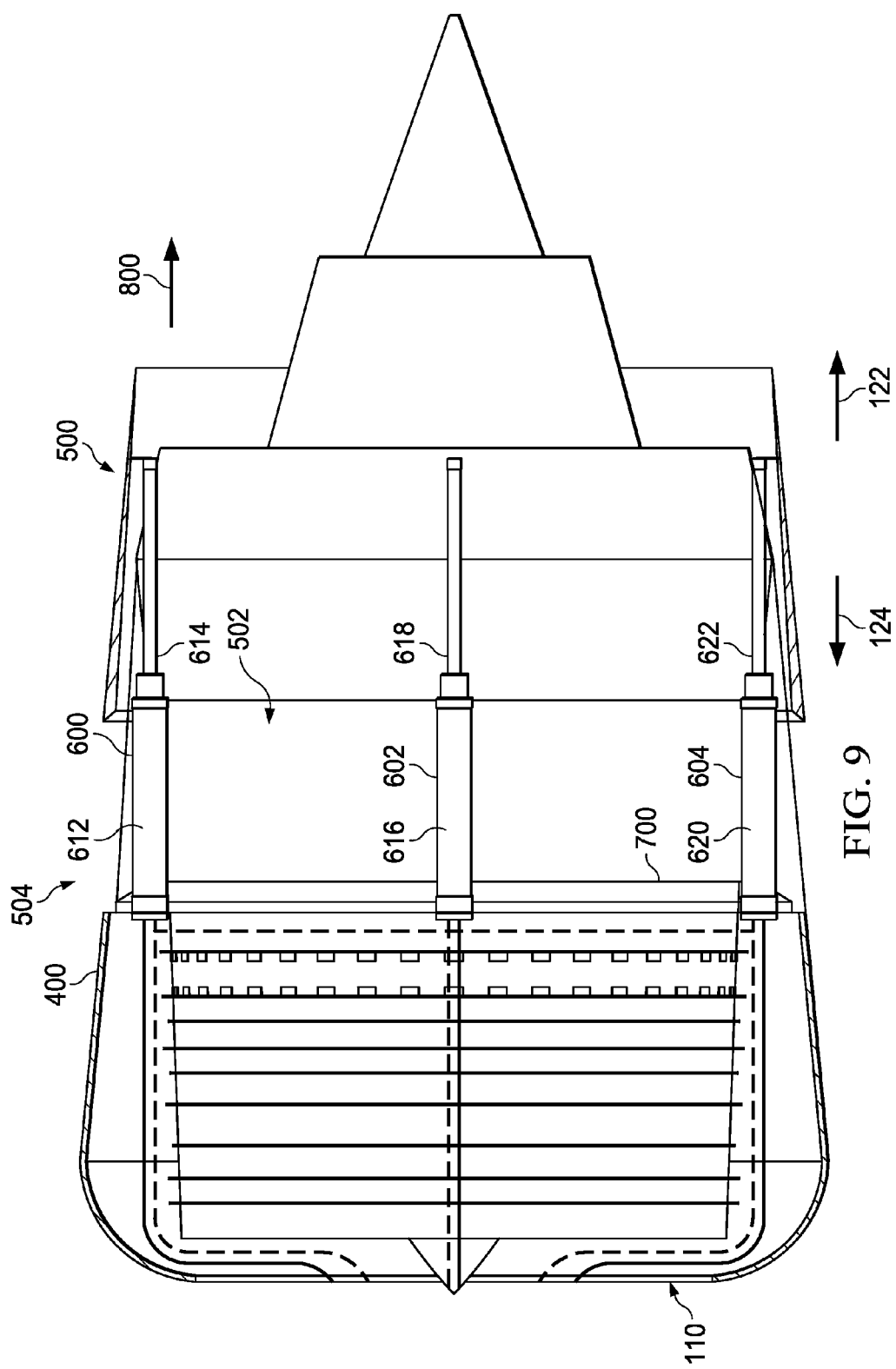
FIG. 9 is an illustration of an exposed view of an engine with a movement system configured to move a sleeve for a thrust reverser system in accordance with an illustrative embodiment.

With reference now to FIG. 9, an illustration of an exposed view of an engine with a movement system configured to move a sleeve for a thrust reverser system is depicted in accordance with an illustrative embodiment. In this illustrative example, member 614, member 618, and member 622 have extended from base 612, base 616, and base 620 in the direction of arrow 800 such that sleeve 400 is in second position 500 which is an open position in this depicted example. In second position 500, cascades 502 are illustrated as being exposed as much as possible with sleeve 400 in this position. As a result, more of the thrust is substantially directed in the direction of arrow 124 instead of the direction of arrow 122.

Figure 10:
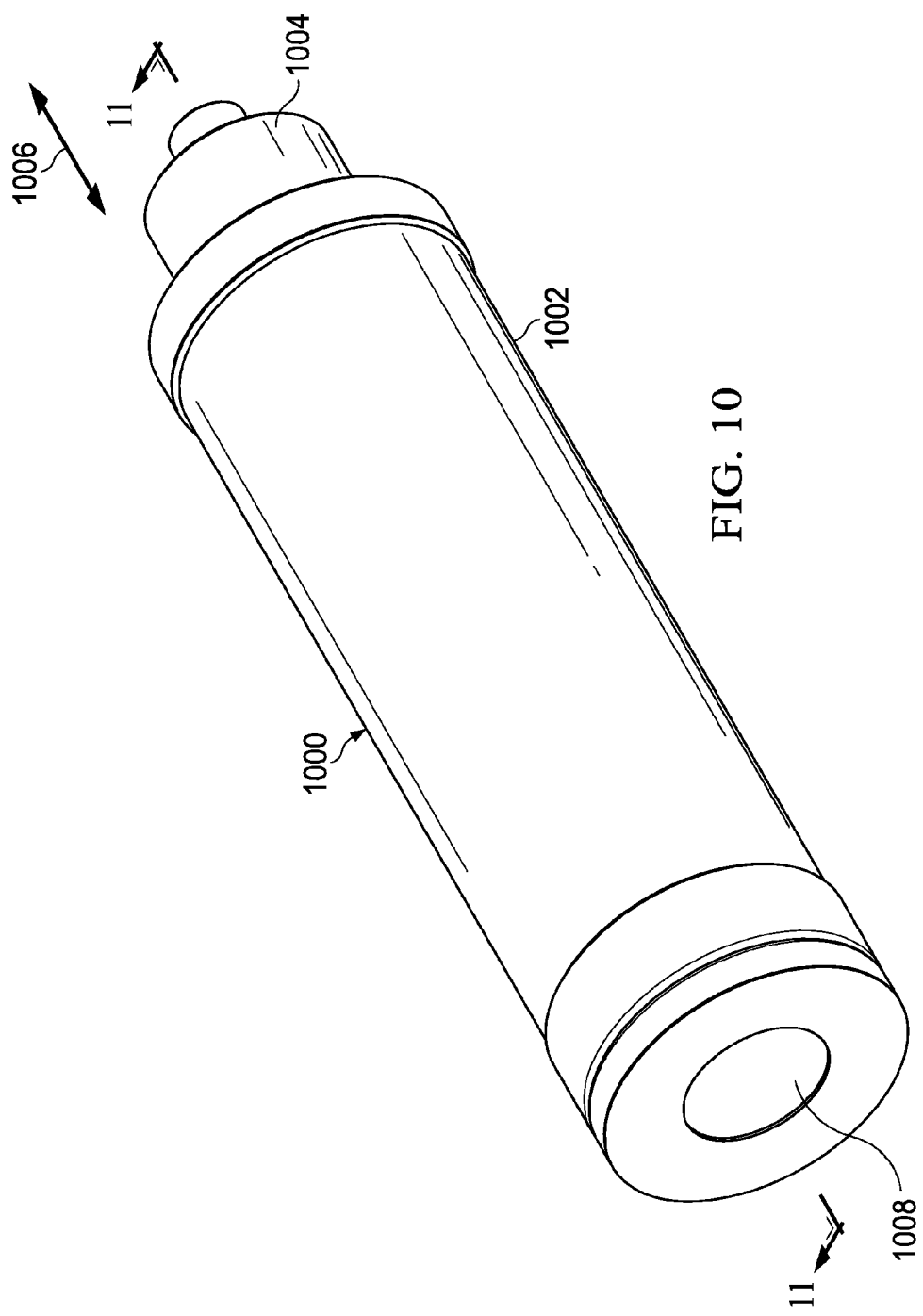
FIG. 10 is an illustration of a linear electric motor in accordance with an illustrative embodiment.

Turning now to FIG. 10, an illustration of a linear electric motor is depicted in accordance with an illustrative embodiment. As depicted, linear electric motor 1000 comprises base 1002 and member 1004. Member 1004 is moveable in the direction of arrow 1006. The movement of member 1004 occurs through motor 1008 located inside of base 1002. In this illustrative example, motor 1008 is configured to move member 1004 in the direction of arrow 1006 without needing gears, linkages, or other moving parts that may increase maintenance needs for linear electric motor 1000.

Figure 11:
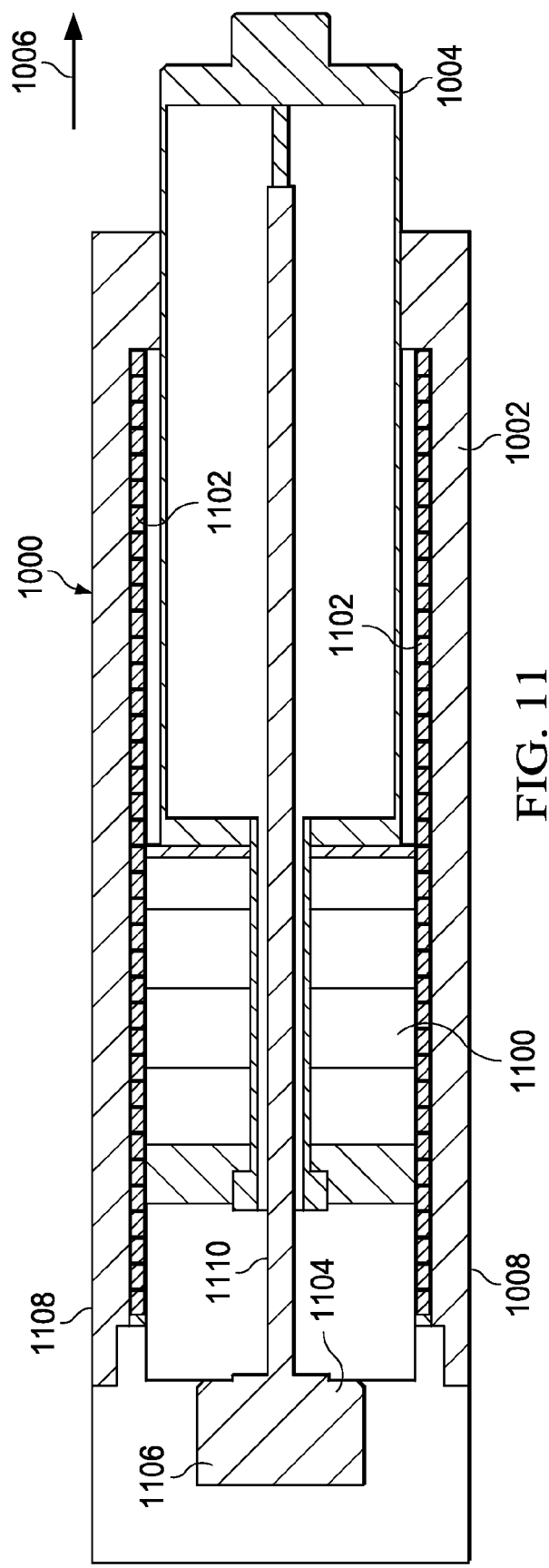
FIG. 11 is an illustration of a cross-sectional view of a linear electric motor in accordance with an illustrative embodiment.

Turning now to FIG. 11, an illustration of a cross-sectional view of a linear electric motor is depicted in accordance with an illustrative embodiment. In this illustrative example, linear electric motor 1000 is shown in a cross-sectional view taken along lines 11-11 in FIG. 10.

As can be seen in this illustrative example, member 1004 may take the form of a hollow tube that may move in the direction of arrow 1006. This movement may occur through an interaction between magnet system 1100 and coil system 1102 in motor 1008.

In other words, coil system 1102 uses electrical energy to generate magnetic fields. These magnetic fields interact with the magnetic fields in magnet system 1100 to cause linear movement in the direction of arrow 1006. In other words, member 1004 may extend or retract with respect to base 1002 of linear electric motor 1000.

As depicted, coil system 1102 is associated with housing 1108 for base 1002. Magnet system 1100 is moveable along pole 1110. Movement of magnet system 1100 along pole 1110 causes movement of member 1004. As can be seen, the movement of member 1004 occurs using forces caused by electromagnetic fields. These forces result in linear movement in the direction of arrow 1006 by attaching member 1004 to a structure, such as a sleeve, the sleeve may be moved without needing additional components such as gears, linkages, or other similar components.

In these illustrative examples, base 1002 may also include position detector 1104 and load cell 1106. In these illustrative examples, position detector 1104 in load cell 1106 is shown as part of linear electric motor 1000. In other illustrative examples, these components may be external and separate from linear electric motor 1000.

In these illustrative examples, linear electric motor 1000 may be implemented using any currently available electric motor that converts electrical energy into mechanical energy in which the mechanical energy is directed linearly. In other illustrative examples, linear electric motors may be used that may use stators, opposing coils, or other components in place of or in addition to magnet system 1100.

Figure 12:
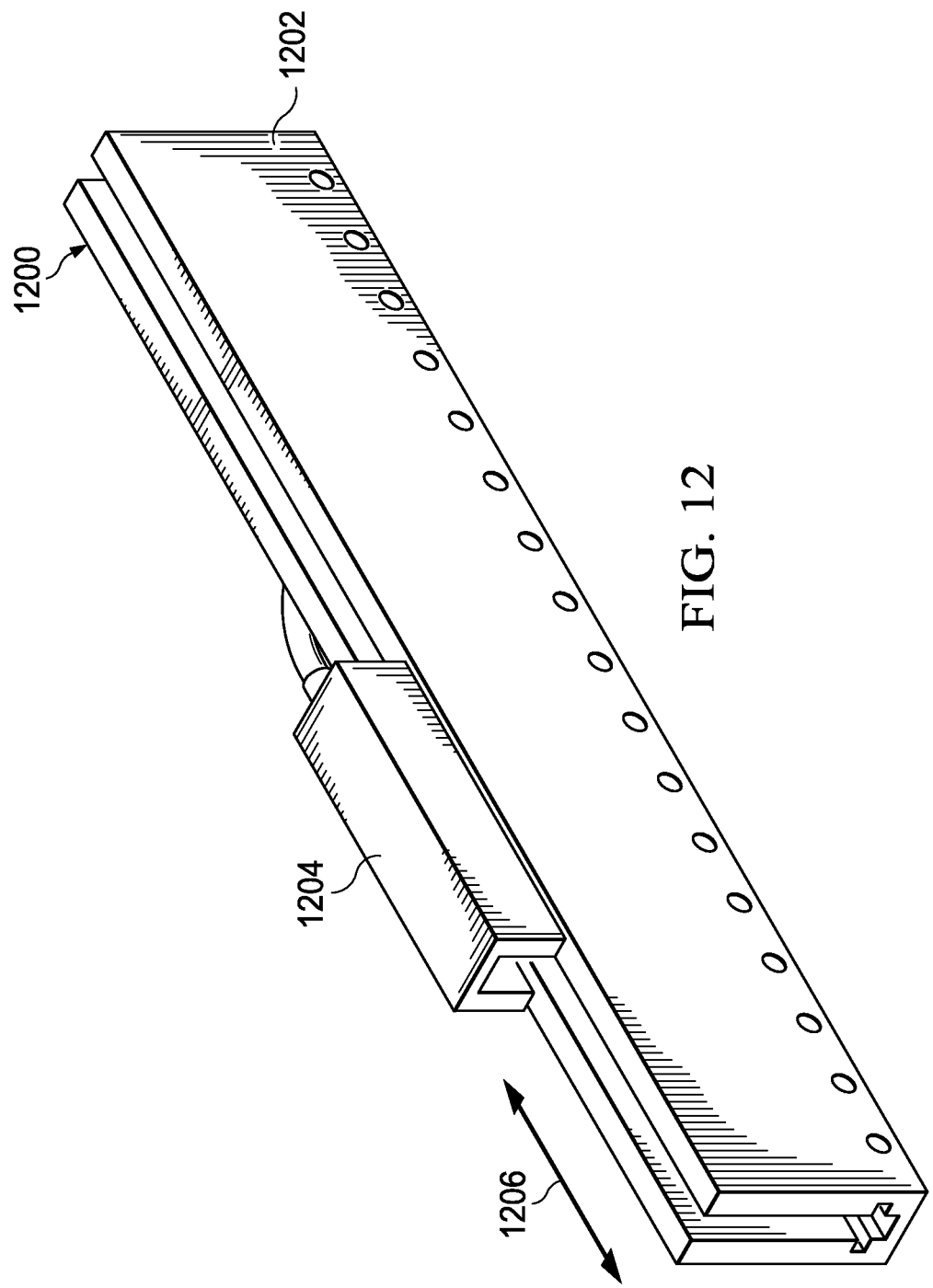
FIG. 12 is an illustration of a linear electric motor in accordance with an illustrative embodiment.

Turning now to FIG. 12, an illustration of a linear electric motor is depicted in accordance with an illustrative embodiment. In this illustrative example, linear electric motor 1200 comprises base 1202 and member 1204. Member 1204 may be connected to a sleeve. Base 1202 may be connected to another structure in an engine.

Member 1204 may move in the direction of arrow 1206. In this illustrative example, linear electric motor 1200 may include coils, stators, and magnets that use electro-magnetic forces to move member 1204.

Figure 13:
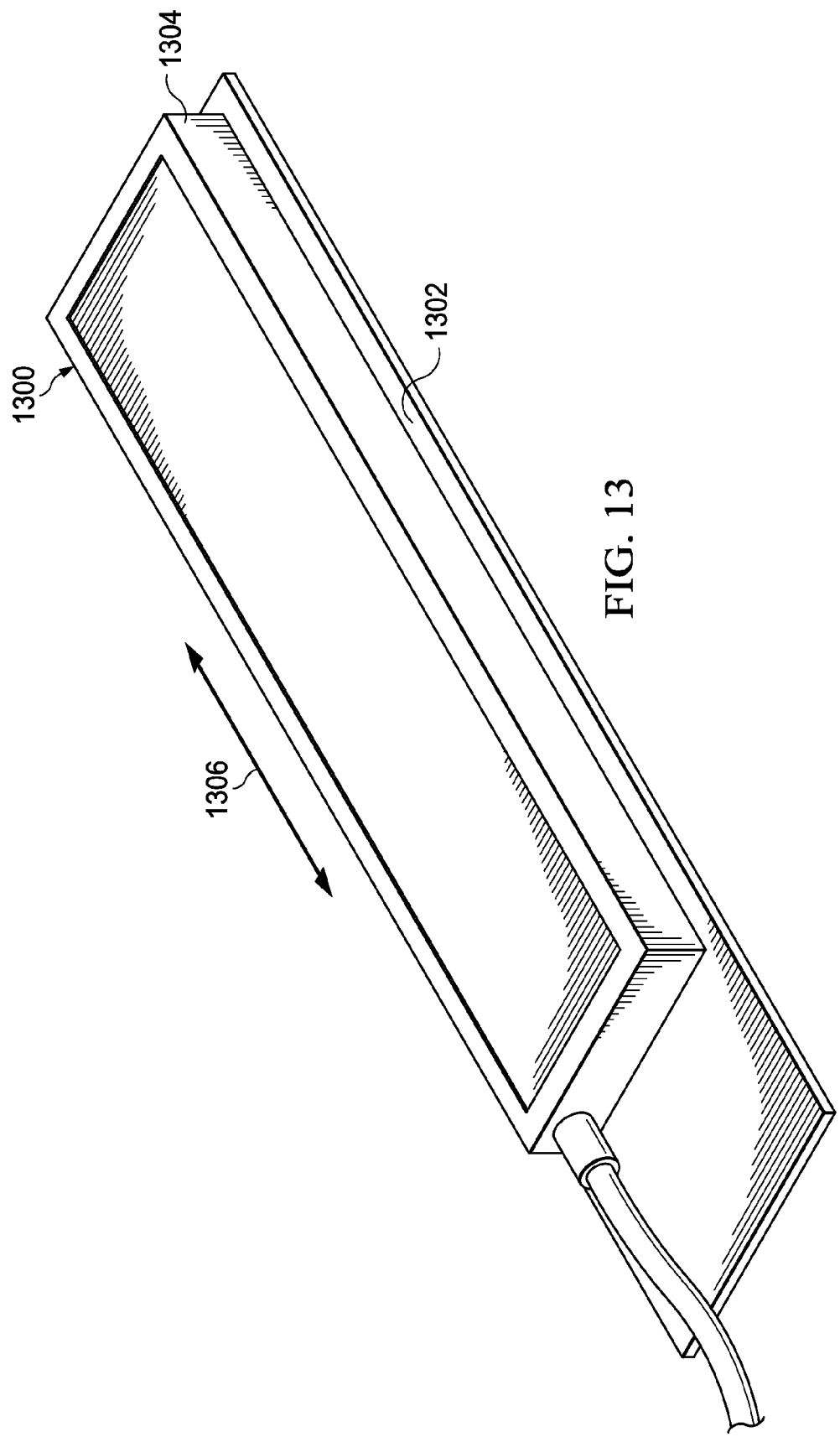
FIG. 13 is an illustration of a linear electric motor in accordance with an illustrative embodiment.

With reference now to FIG. 13, an illustration of a linear electric motor is depicted in accordance with an illustrative embodiment. As depicted, linear electric motor 1300 comprises base 1302 and member 1304. Movement of member 1304 may be caused through the conversion of electrical energy into mechanical energy in which electro-magnetic forces are used to cause the movement. Member 1304 may be moved in the direction of arrow 1306. In this illustrative example, base 1302 may be connected to a structure on an engine, while member 1304 may be connected to a sleeve.

The illustration of the different components in FIG. 1 and FIGS. 4-13 are not meant to imply limitations to the manner in which different components may be implemented. For example, the examples of linear electric motors depicted in FIGS. 10-13 are only illustrative examples and are not meant to depict the only types of linear electric motors that may be used in accordance with an illustrative embodiment.

As another example, although FIGS. 6-9 illustrate the use of three linear electric motors with each sleeve, other numbers of linear electric motors may be used. For example, a sleeve may be moved using two linear electric motors, four linear electric motors, or some other number of linear electric motors depending on the implementation.

Two sleeves, sleeve 400 and sleeve 402, are show for engine 110 in FIG. 4 and FIG. 5. In other illustrative examples, only a single sleeve may be present. In still other examples, more than two sleeves may be present for engine 110.

The different components shown in FIG. 1 and FIGS. 4-13 may be combined with components in FIG. 2 and FIG. 3, used with components in FIG. 2 and FIG. 3, or a combination of the two. Additionally, some of the components in FIG. 1 and FIGS. 4-13 may be illustrative examples of how components shown in block form in FIG. 2 and FIG. 3 can be implemented as physical structures.

Figure 14:
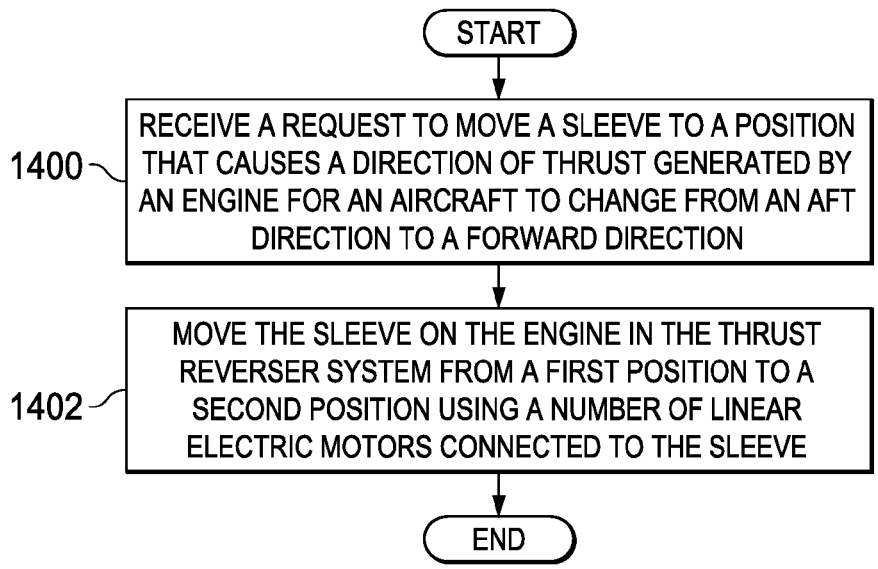
FIG. 14 is an illustration of a flowchart of a process for operating a thrust reverser system for an aircraft in accordance with an illustrative embodiment.

Turning now to FIG. 14, an illustration of a flowchart of a process for operating a thrust reverser system for an aircraft is depicted in accordance with an illustrative embodiment. The process illustrated in FIG. 14 may be implemented using thrust reverser system 200 in FIG. 2 or thrust reverser system 300 in FIG. 3.

The process begins by receiving a request to move a sleeve to a position that causes a direction of thrust generated by an engine for an aircraft to change from an aft direction to a forward direction (operation 1400). The process moves the sleeve on the engine in the thrust reverser system from a first position to a second position using a number of linear electric motors connected to the sleeve (operation 1402) with the process terminating thereafter. The second position is one that causes thrust generated by the engine for the aircraft to be directed in a substantially opposite direction. The direction is changed from an aft direction to a forward direction in this example.

In these illustrative examples, the same process may be performed to move the sleeve from the second position back to the first position. In the first position, the thrust is directed in an aft direction.

Figure 15:
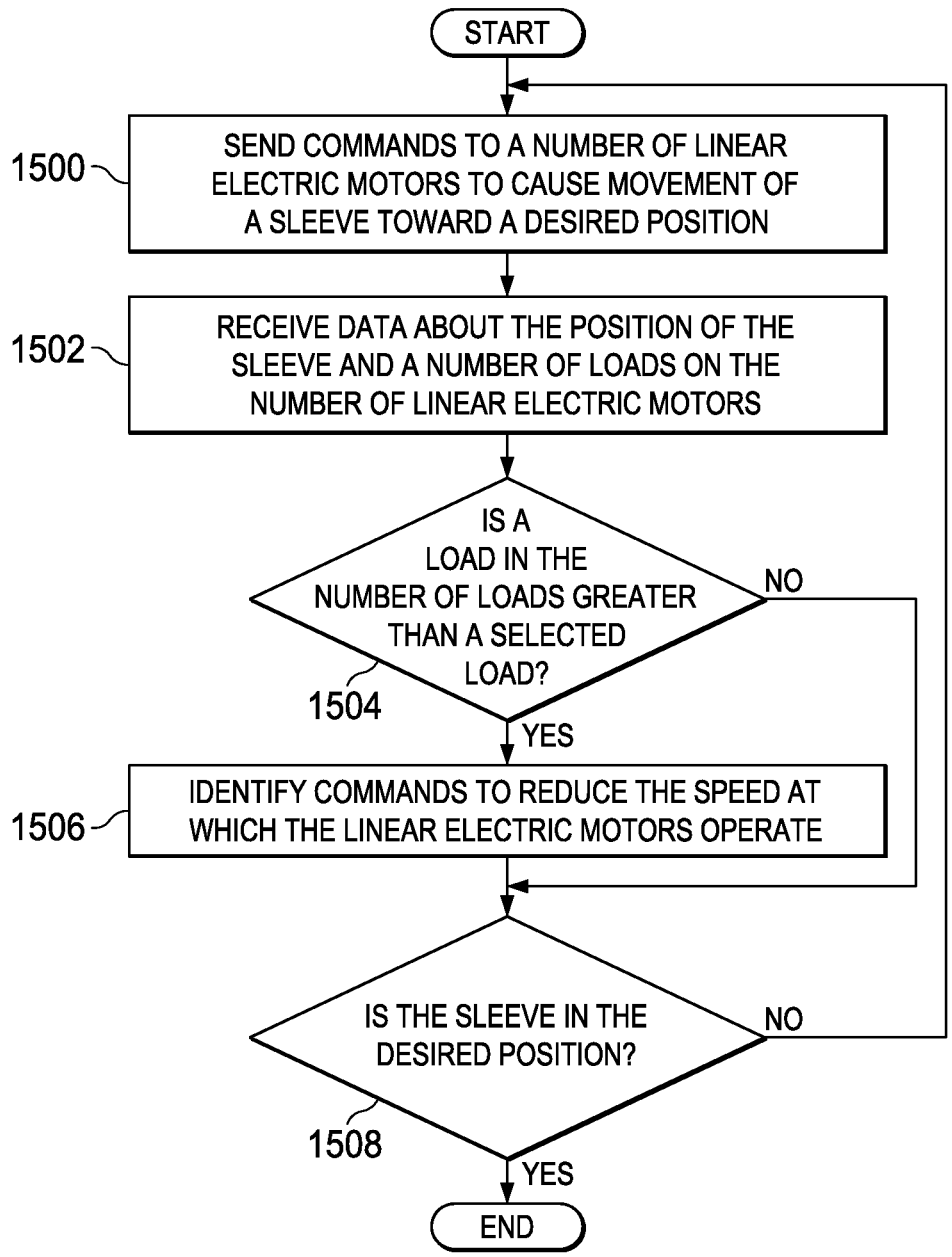
FIG. 15 is an illustration of a flowchart of a process for moving a sleeve in a thrust reverser system in accordance with an illustrative embodiment.

Turning now to FIG. 15, an illustration of a flowchart of a process for moving a sleeve in a thrust reverser system is depicted in accordance with an illustrative embodiment. This process may be implemented in thrust reverser system 200 in FIG. 2 and thrust reverser system 300 in FIG. 3.

The process begins by sending commands to a number of linear electric motors to cause movement of a sleeve toward a desired position (operation 1500). The process receives data about the position of the sleeve and a number of loads on the number of linear electric motors (operation 1502).

The position information about the sleeve may be calculated from the position of the linear electric motors. In other illustrative examples, the position information may be obtained from a sensor associated with the sleeve. The information about the number of loads is received from the number of linear electric motors in this illustrative example.

A determination is made as to whether a load in the number of loads is greater than a selected load (operation 1504). If a load in the number of loads is greater than a selected load, commands are identified to reduce the speed at which the linear electric motors operate (operation 1506). A determination is made as to whether the sleeve is in the desired position (operation 1508). If the sleeve is in the desired position, the process terminates. Otherwise, the process returns to operation 1500. With reference again to operation 1504, if a load in the number of loads is not greater than a selected load, the process proceeds to operation 1508.

Figure 16:
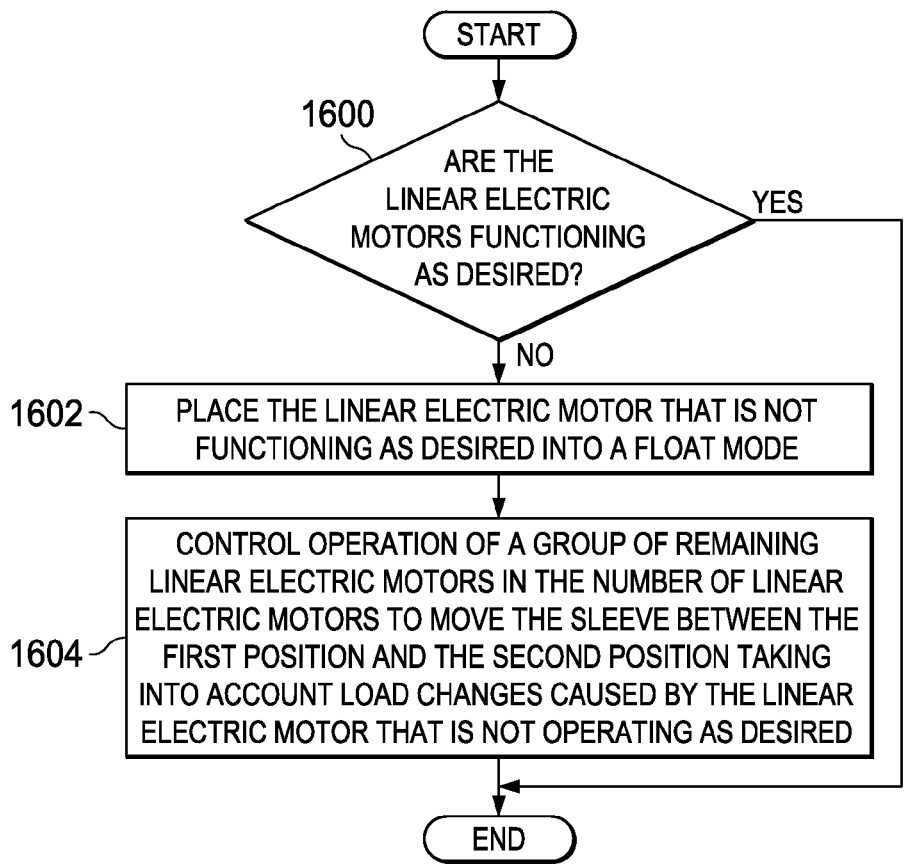
FIG. 16 is an illustration of a flowchart of a process for operating linear electric motors to move a sleeve in accordance with an illustrative embodiment.

Turning now to FIG. 16, an illustration of a flowchart of a process for operating linear electric motors to move a sleeve is depicted in accordance with an illustrative embodiment. This process may be implemented in thrust reverser system 200 in FIG. 2 and thrust reverser system 300 in FIG. 3.

The process begins by determining whether the linear electric motors are functioning as desired (operation 1600). In these illustrative examples, a controller, such as controller 302 in FIG. 3, may make the determination in operation 1600. This determination may be made based on data received from the linear electric motors or a lack of data received from the linear electric motors. For example, data may indicate whether a linear electric motor is moving or responding as expected to commands sent to the linear electric motor. Lack of data may indicate that the linear electric motor is not functioning. Undesired operation may be reported such that maintenance may be performed on a linear electric motor that is identified as not operating as desired.

If one of the linear electric motors is functioning as desired, the process terminates. Otherwise, the process places the linear electric motor that is not functioning as desired into a float mode (operation 1602). In operation 1602, the linear electric motor is controlled such that the member connected to the sleeve moves freely. In other words, the linear electric motor does not generate any force to move the member or maintain the member in a particular position.

The process then controls operation of a group of remaining linear electric motors in the linear electric motors to move the sleeve between the first position and the second position taking into account load changes caused by the linear electric motor that is not operating as desired (operation 1604), with the process terminating thereafter. As used herein, a "group" when used with reference to items means one or more items. For example, a group of remaining linear electric motors is one or more remaining linear electric motors. In operation 1604, these load changes may be taken into account such that the load on the group of linear electric motors is below a selected load such as selected load 240 in FIG. 2.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for moving a sleeve in a thrust reverser system. In the illustrative embodiments, linear electric motors are used to move the sleeve. These linear electric motors may be directly connected to the sleeve. In other words, linkages, gears, or other moving components may be absent in the connection. This type of connection may reduce the amount of maintenance needed for a thrust reverser system.

Further, with the use of linear electric motors, maintenance associated with the use of hydraulics systems also may be reduced. For example, maintenance needed to manage fluids that may leak may be unnecessary using an illustrative embodiment.

Additionally, with linear electric motors, the movement of a sleeve may occur more quickly and precisely as compared to hydraulics systems used to move a sleeve. In addition, the illustrative examples may control operation of the linear electric motors such that the loads on the linear electric motors remain below a selected load. The selected load may be one that may result in increased maintenance for the linear electric motors. In some cases, the selected load may be one in which the linear electric motors are unable to support during movement of the sleeve. As a result, smaller linear electric motors may be used, which may result in less weight and a lower cost.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sleeve configured to move between a first position and a second position, wherein the sleeve exposes a cascade when in the second position;
   at least one linear electric motor directly connected to the sleeve and configured to move the sleeve between the first position and the second position, wherein the at least one linear electric motor comprises: a coil system disposed within a base connected to an engine structure, a member connected to the sleeve, and a magnet system connected to the member and configured to interact with the coil system to linearly move the member relative to the base to cause the sleeve to move between the first position and the second position;

a controller configured to control operation of the at least one linear electric motor to move the sleeve between the first position and the second position; and a load cell, disposed within the base, configured to send load information to the controller, wherein the controller is further configured to use the load information to maintain a desired load on the at least one linear electric motor.

2. The apparatus of claim 1, wherein the controller is configured to control operation of the at least one linear electric motor to move the sleeve between the first position and the second position with a desired number of speeds.

3. The apparatus of claim 1 further comprising:
a sensor system configured to measure a position of the sleeve.

4. The apparatus of claim 1, wherein the controller is configured to synchronize the at least one linear electric motor to move the sleeve.

5. The apparatus of claim 1, wherein the controller is configured to compensate for a linear electric motor in the at least one linear electric motor that is not functioning as commanded.

6. The apparatus of claim 5, wherein the controller is further configured to control operation of a group of remaining linear electric motors in the at least one linear electric motor to move the sleeve between the first position and the second position taking into account load changes caused by the linear electric motor to maintain a load on the group of remaining linear electric motors below a selected load.

7. The apparatus of claim 5, wherein the controller causes the linear electric motor to operate in a mode in which the member that is connected to the sleeve floats such that the linear electric motor does not actively move.

8. The apparatus of claim 1, wherein the controller is configured to stop the sleeve in at least one of the first position and the second position.

9. The apparatus of claim 1, wherein the controller is configured to reduce a speed of the at least one linear electric motor while moving the sleeve between the first position and the second position to maintain a load on the at least one linear electric motor caused by moving the sleeve below a selected threshold.

10. The apparatus of claim 1, wherein the at least one linear electric motor is directly connected to only one sleeve.

11. A thrust reverser system comprising:
a sleeve configured to move between a first position and a second position, wherein the sleeve exposes a cascade when in the second position;
at least one linear electric motor having a coil system disposed within a base connected directly to an engine structure, a member connected directly to the sleeve, and a magnet system connected to the member and configured to interact with the coil system to linearly move the member relative to the base to cause the sleeve to move between the first position and the second position; and
a load cell, disposed within the base, configured to send load information to a controller, wherein the controller is configured to use the load information to maintain a desired load on the at least one linear electric motor.

12. The thrust reverser system of claim 11 further comprising:
a plurality of linear electric motors having a base connected to an engine structure; and
the member directly connected to the sleeve and configured to move the sleeve between the first position and the second position.

13. The thrust reverser system of claim 11 further comprising:
a sensor system configured to detect a load on the at least one linear electric motor while moving the sleeve and measure a position of the sleeve; and
the controller configured to control operation of the at least one linear electric motor to move the sleeve between the first position and the second position and control a speed at which the at least one linear electric motor moves the sleeve to maintain a load on the at least one linear electric motor below a selected load.

14. The thrust reverser system of claim 11, wherein the controller is configured to stop the sleeve in at least one of the first position and the second position.

15. The thrust reverser system of claim 11, wherein the controller is further configured to compensate for a linear electric motor in the at least one linear electric motor not functioning as commanded.

16. A method for operating a thrust reverser system for an aircraft, the method comprising:
moving a sleeve on an engine in the thrust reverser system from a first position to a second position using a linear electric motor directly connected to the sleeve and to a structure of the engine, wherein the moving of the sleeve to a second position exposes a cascade such that exhaust gasses generated by the engine pass through the cascade;
wherein the at least one linear electric motor comprises:
a base;
a coil system associated with the base;
a member connected to the sleeve;
a magnet system associated with the member and configured to interact with the coil system to linearly move the member relative to the base to cause the sleeve to move between the first position and the second position; and
a load cell, disposed within the base, configured to send load information to a controller, wherein the controller is configured to use the load information to maintain a desired load on the at least one linear electric motor.

17. The method of claim 16 further comprising:
moving the sleeve from the first position to the second position using a plurality of linear electric motors.

18. The method of claim 16 further comprising:
determining whether a load on a plurality of linear electric motors is greater than a selected load; and
adjusting a speed of the plurality of linear electric motors to reduce the load on the plurality of linear electric motors when the load is equal to or greater than the selected load.

19. The method of claim 18, wherein the selected load is one that is greater than a desired load for the plurality of linear electric motors.

20. The method of claim 16, wherein operation of the linear electric motor is controlled by the controller.

21. The method of claim 17, wherein moving the sleeve on the engine in the thrust reverser system from the first position to the second position using the plurality of linear electric motors connected to the sleeve comprises:
sending a command to the plurality of linear electric motors to move the sleeve in a direction from the first position towards the second position;
monitoring a position of the sleeve; and
halting operation of the plurality of linear electric motors to halt movement of the sleeve when the second position is reached.

* * * * *